(12) United States Patent
Chintalapti et al.

(10) Patent No.: US 7,546,222 B2
(45) Date of Patent: Jun. 9, 2009

(54) SYSTEM FOR PERFORMANCE AND SCALABILITY ANALYSIS AND METHODS THEREOF

(75) Inventors: Ramkumar N. Chintalapti, Hyderabod (IN); Rajeshwari Ganesan, Bangalore (IN); Sachin Ashok Wagh, Mumbai (IN)

(73) Assignee: Infosys Technologies, Ltd., Bangalore (IN)

( * ) Notice: Subject to any disclaimer, the term of this patent is extended or adjusted under 35 U.S.C. 154(b) by 50 days.

(21) Appl. No.: 11/633,577

(22) Filed: Dec. 5, 2006

(65) Prior Publication Data

US 2008/0133435 A1    Jun. 5, 2008

(30) Foreign Application Priority Data

Jun. 12, 2005   (IN) ................ 1787/CHE/2005

(51) Int. Cl.
    G06F 19/00      (2006.01)
(52) U.S. Cl. .................................... 702/186
(58) Field of Classification Search ......... 702/182–185, 702/186
    See application file for complete search history.

(56) References Cited

U.S. PATENT DOCUMENTS

| | | | |
|---|---|---|---|
| 5,996,090 A | 11/1999 | Hellerstein | |
| 6,470,464 B2 | 10/2002 | Bertram et al. | |
| 6,678,355 B2 * | 1/2004 | Eringis et al. | ............. 379/22 |
| 6,792,393 B1 | 9/2004 | Farel et al. | |
| 2004/0059704 A1 | 3/2004 | Hellerstein et al. | |

OTHER PUBLICATIONS

Joseph Hellerstein, "GAP: A General Approach to Quantitative Diagnosis of Performance Problems", Journal of Network and Systems Management, vol. 11, No. 2, Jun. 2003, pp. 199-216.
Ron Lee, "Performance Analysis: Isolating the Real Bottleneck in a System", Articles and Tip: article, Jan. 1, 1996, pp. 1-4.
Chintalapati et al., "Design of a Performance Diagnosis tool for .NET Applications", Article for Dr. Dobbs Journal, USA, Aug. 2005 Issue.

* cited by examiner

*Primary Examiner*—Edward Raymond
(74) *Attorney, Agent, or Firm*—Marc S. Kaufman; Nixon Peabody LLP (57) ABSTRACT

A system adapted for analyzing performance and scalability of at least one computer system is disclosed. The system include a monitoring module configured for capturing at least one metric of an application for analyzing performance and scalability and a performance knowledge repository created and represented by using the at least one metric captured by the monitoring module. The system further includes a diagnosis module adapted for mapping the at least one metric to the performance knowledge repository using a diagnosis module and an analysis module configured for conducting performance and scalability analysis based on the mapping of the at least one metric for detecting at least one undesirable condition.

28 Claims, 5 Drawing Sheets

FIG. 5

SYSTEM FOR PERFORMANCE AND SCALABILITY ANALYSIS AND METHODS THEREOF

CROSS REFERENCE TO RELATED DOCUMENTS

This application claims priority under 35 U.S.C. §119 to Indian Patent Application Serial No. 1787/CHE/2005 of CHINTALAPTI et al., entitled "SYSTEM FOR PERFORMANCE AND SCALABILITY ANALYSIS AND METHODS THEREOF," filed Dec. 6, 2005, the entire disclosure of which is hereby incorporated by reference herein.

BACKGROUND OF THE INVENTION

Field of the Invention

The invention relates generally to computer systems, and more particularly, to a system and method for analyzing performance and scalability in any computer systems running an application.

DISCUSSION OF THE BACKGROUND

Managing a computer system, which includes a plurality of devices such as networks or servers, are of special interest to data processing (or information technology) personnel. The computer systems typically include a plurality of diverse devices such as memory, disks, local area network (LAN) adapters and central processing units (CPUs) which interact in various interrelated ways when a variety of applications are used in the computer system. As the systems get larger and more complex, these interactions become hard to define, model or predict the relationships between the devices, and hence the capacity of the system becomes difficult to manage. These systems are quite expensive to install and changes to the system involve a significant investment, so, while an investment is desirable which will improve the performance of the computer system, some investments in improvements to the computer system would not be worthwhile since the performance of the overall system would not improve.

Frequently, the performance of the computer system or network is less than it could be because one or more of the components is not appropriate for application loading of the computer system (or a network or server). It is desirable to know what changes to the computer system would be worthwhile in improving the performance of the computer system and making those changes while avoiding changes which would not have a significant benefit to the performance of the computer system.

A critical element of operations and management is managing performance problems, such as addressing long response times in client-server systems and low throughputs for database updates. Such considerations require mechanisms for detecting, diagnosing, and resolving performance problems. Detection uses one or more measurement variables to sense when a problem occurs, such as using on-line change-point detection algorithms to sense changes in client-server response times. Diagnosis isolates problems to specific components so that appropriate actions can be identified, such as attributing large client-server response times to excessive LAN utilizations. Resolution selects and implements actions that eliminate the problem, such as increasing LAN capacity or reducing LAN traffic.

Performance and scalability are very crucial non-functional requirements of software systems. While performance defines the efficiency and the responsiveness of the system software, scalability defines the ability of the system to retain its performance even with increasing workload or data volumes. In order that the software system delivers its required performance and scalability needs, its analysis needs to be undertaken at every stage in the software development and post deployment lifecycle. This will ensure that performance bottlenecks or an undesirable condition may be identified and fixed early.

To conduct a performance analysis, a person would require considerable knowledge on, the metrics that are relevant to be captured at the lifecycle stages, their acceptable values or thresholds, and the known relationships between one or more metrics that will need to be analyzed to interpret the behavior of the system.

These metrics that are collected and analyzed come from the different layers in the computer system such as the system resource layer (e.g. processors, networks etc), software infrastructure layers (operating systems, middleware, databases etc.) and the application layer. Hence, the task of doing performance analysis becomes very complex and requires subject matter experts in multiple areas.

Conventionally, the existing tools in performance management area come under the category of load testing tools (example, Mercury's Load Runner, Radview's Webload etc.), code profiler (example, Jprobe, .NET CLR profiler etc.), enterprise management tools (example, HP OpenView, CA Unicenter etc.), performance modeling and forecasting tools (example, Metron Athene, TeamQuest, MATLAB etc.).

The above tools allow the generation of virtual load and monitor the metrics during performance testing. It also allows the users to monitor performance metrics in-order to pinpoint software code-level bottlenecks. Both of these categories of tools are used during software development lifecycle stages. Likewise, other tools are used after the software system is deployed, and allow monitoring and control of these systems based on specification of certain performance contracts.

However, all the above conventional methods require the intervention of subject matter experts to analyze the relevant metrics collected/output from these tools (either by monitoring or prediction) to conclude on the performance and scalability of these systems. This makes performance analysis very complex, time consuming and prone to incomplete analysis.

Accordingly, there is a need for an improved technique for automating the performance and scalability of the computer system, thereby increasing the efficiency and effectiveness in the implementation of any application in the computer system.

SUMMARY OF THE INVENTION

In one embodiment of the present technique, a system adapted for analyzing performance and scalability of at least one computer system is disclosed. The system includes a monitoring module configured for capturing at least one metric of an application for analyzing performance and scalability and a performance knowledge repository created and represented by using the at least one metric captured by the monitoring module. The system further includes a diagnosis module adapted for mapping the at least one metric to the performance knowledge repository using a diagnosis module and an analysis module configured for conducting performance and scalability analysis based on the mapping of the at least one metric for detecting at least one undesirable condition.

In another embodiment of the present technique, a method adapted for analyzing performance and scalability of at least one computer system is disclosed. The method includes capturing at least one metric of an application for analyzing performance and scalability using a monitoring module and creating and representing and storing a performance knowledge repository indicative of the at least one metric. The method further includes mapping the at least one metric to the performance knowledge repository using a diagnosis module and analyzing the performance and scalability of the computer system based on the mapping of the at least one metric for identifying at least one an undesirable condition using an analysis module.

In yet another embodiment of the present technique, a method for detecting at least one undesirable condition of at least one computer system is disclosed. The method includes capturing at least one metric of an application for analyzing performance and scalability and creating and representing a performance knowledge repository indicative of the at least one metric. The method further includes mapping the at least one metric to the performance knowledge repository using a diagnosis module and detecting the at least one undesirable condition by analyzing the performance and scalability of the computer system. Furthermore, the method includes automatically rectifying the at least one undesirable condition during post deployment stage of the application.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE PREFERRED EMBODIMENTS

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

Figure 1:
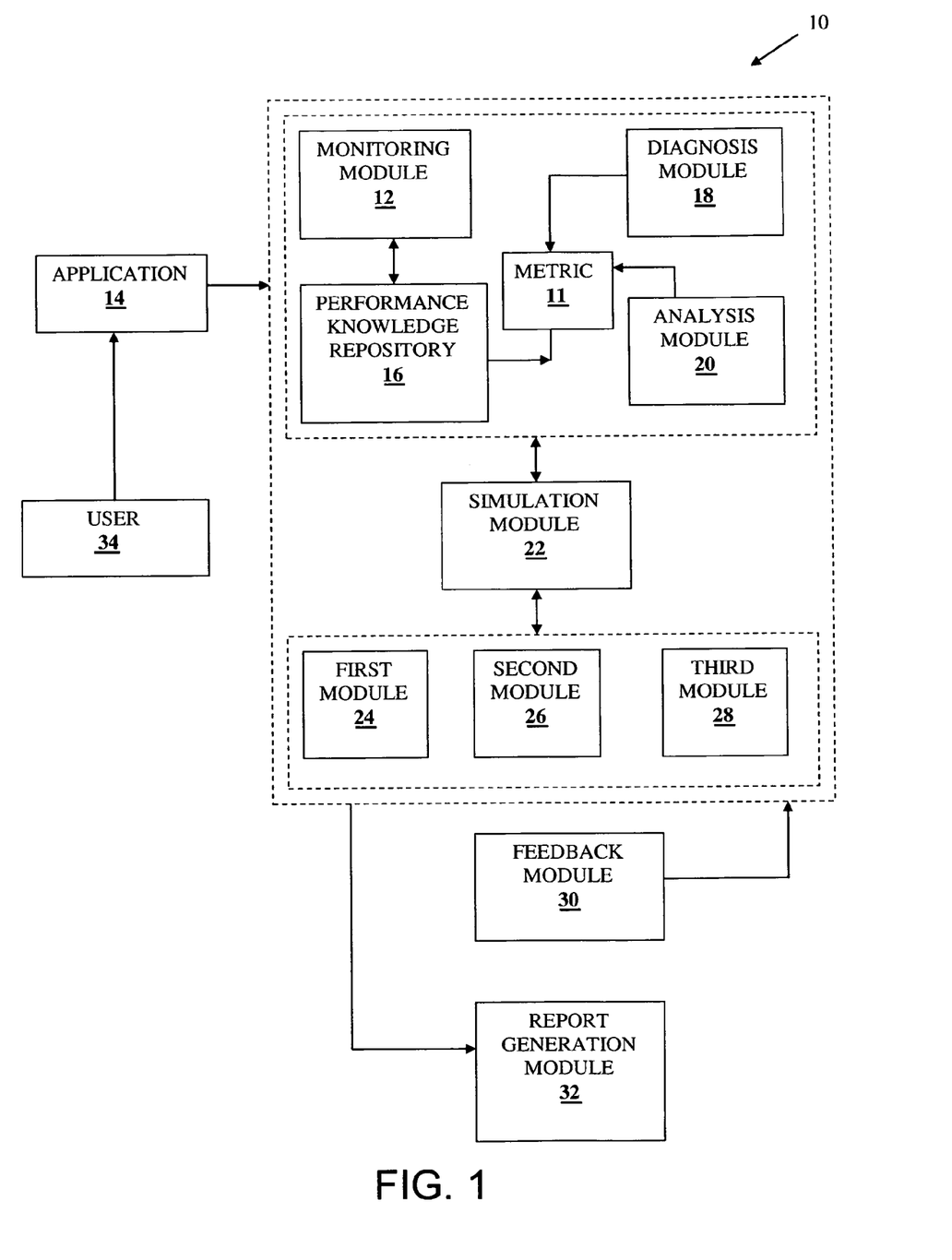
FIG. 1 depicts a block diagram of a system for analyzing performance and scalability of a computer system, in accordance with an embodiment of the present technique.

FIG. 1 depicts a block diagram of a system 10 for analyzing performance and scalability of a computer system. As will be appreciated by those skilled in the art, computer system in the present discussion may be referred as a system having one or more computer adapted to perform a workflow. A workflow is a description of a process in terms of the steps or tasks or jobs that comprise the process. Like a flow diagram, a workflow describes the steps in a process and the dependency among steps. Each step is a task to be performed in the process. A workflow definition may include a description of the desired behavior that occurs when a step is executed and a description of step dependencies in terms of steps and data. A step dependency may include a dependency on the state of one or more steps and/or the state or value of one or more data variables. Performance of a computer system may be defined as its ability to perform effectively by taking into account the over all system metrics like throughput, response time, and availability. A computer system with high performance levels would be expected to meet its desired values of throughput, response time as the load or the user base increases. A system with such characteristics is said to be scalable. Those computer systems which are not meeting these desired performance values are considered to be performing poorly.

As illustrated in FIG. 1, the system 10 includes a monitoring module 12 adapted for capturing at least one metric 11 of an application 14 for analyzing performance and scalability. The application 14 in the present context may comprise at least one of a web based application, or a client server application or combinations thereof. The system 10 also includes a performance knowledge repository 16, wherein the performance knowledge repository 16 may be created and represented by using the at least one metric 11 captured by the monitoring module 12.

There are two types of metrics that need to be considered for analysis. Firstly, an overall application metric and secondly system resource level metric. The overall application metrics, for example throughput and response time, may be obtained from load testing tools like Microsoft's ACT, Mercury Interactive Load Runner, Radview's WebLoad, Seague's Silk Performer for a given number of concurrent users and think time (refer to table 1). A load testing tool is a tool that is either custom built or available in market for automating load or stress or performance related tests. The system resource level metrics may be obtained from various performance monitoring tools available in the market. For example, Windows system monitor (Microsoft's Perfmon/Logman) has well defined performance objects for each layer of the Microsoft .NET stack. These performance objects are nothing but a logical collection of counters that reflect the health of a resource. The threshold for each of these counters may also depend on the type of server on which it is processed. For example, Microsoft products such as Commerce Server, Web Server (IIS) and Database Server (SQL Server) have their own subset of these objects and their thresholds may differ. A small subset of these performance patterns is shown in Table 2.

TABLE 1

Operational Laws [4]:

Let,
N: Number of users
X: Transaction throughput (in transaction/sec)
R: Transaction response time (in sec)
S: Service Demand (in sec)
Z: Think time (in sec)
U: Utilization of the resource (% of time the resource is busy)
Then,
The Utilization Law: U = X*S; facilitates the computation of the service demand.
The Little's Law: N = X* (R+Z); Little's Law check is mandatory even before we look for bottlenecks in the application as this validates the test bed. If Little's Law is violated it means that either the testing process or the test data captured is incorrect.

TABLE 2

Mapping between various servers and their respective metrics:

| Server Type | Performance Object\Performance Counter |
|---|---|
| All Servers | Processor\% Processor Time |
| | Memory\Available Mbytes |
| | Memory\Pages/sec |
| | Network Interface\Bytes Total/sec |
| | Network Interface\Output Queue Length |
| | System\Context Switches/sec |
| Web/Database Server | System\Processor Queue length |
| | Server\Bytes Total/sec |
| | Memory\Pool Nonpaged Bytes |
| | Cache\MDL Read Hits % |
| | Memory\Page Reads/sec |
| Web Server | .NET CLR Memory\# Gen 1 Collections |
| | .NET CLR Memory\# Gen 2 Collections |
| | .NET CLR Memory\% Time in GC |
| | ASP.NET Applications\Requests Timed Out |
| | ASP.NET Applications\Requests/sec |
| | ASP.NET\Request Wait Time |
| | ASP.NET\Request Rejected |
| Database/Commerce Server | PhysicalDisk\Avg. Disk Read Queue Length |
| Database Server | PhysicalDisk\Avg. Disk sec/Transfer |
| | PhysicalDisk\Avg. Disk Write Queue Length |

In one embodiment of the present technique, the performance knowledge repository 16 includes detail information relating to the computer system including but not limited to (a) metrics that have to be captured for performance and scalability analysis relevant to the lifecycle stage, (b) their threshold values and interpretation, and finally (c) the relationships between one or more metrics and their interpretation (d) relevant recommendations or actions to be performed after analysis.

Furthermore, the system 10 includes a diagnosis module 18 adapted for mapping the at least one metric 11 to the performance knowledge repository 16. The system 10 also includes an analysis module 20 adapted for conducting performance and scalability analysis based on the mapping of the at least one metric 11 (as illustrated in table 2 above). In one embodiment of the present technique, the mapping may be done to detect at least one undesirable condition in the computer system. It should be noted that in the present discussion undesirable conditions is also referred as bottlenecks.

As depicted in FIG. 1, the system 10 further includes a simulation module 22, a first module 24, a second module 26, a third module 28, a feedback module 30 and a report generation module 32. The following section explains in detail each of the modules mentioned above.

The simulation module 22 may be adapted for simulating the performance and scalability of the at least one computer system. Likewise, the first module 24 may be adapted for forecasting the performance and scalability patterns for future operations based on the previous completed analysis. The second module 26 may be adapted for generating alert to at least one user 34 of the application 14. The alert system will aid the user in identifying the undesirable condition of the computer system. The feedback module 28 of the system 10 may be adapted for providing feedback to the at least one user 34 on the performance and scalability. The third module 28 adapted for providing recommendations to the at least one user based on the at least one report. The report generation module 32 may be adapted for generating at least one report on the performance and scalability.

Figure 2:
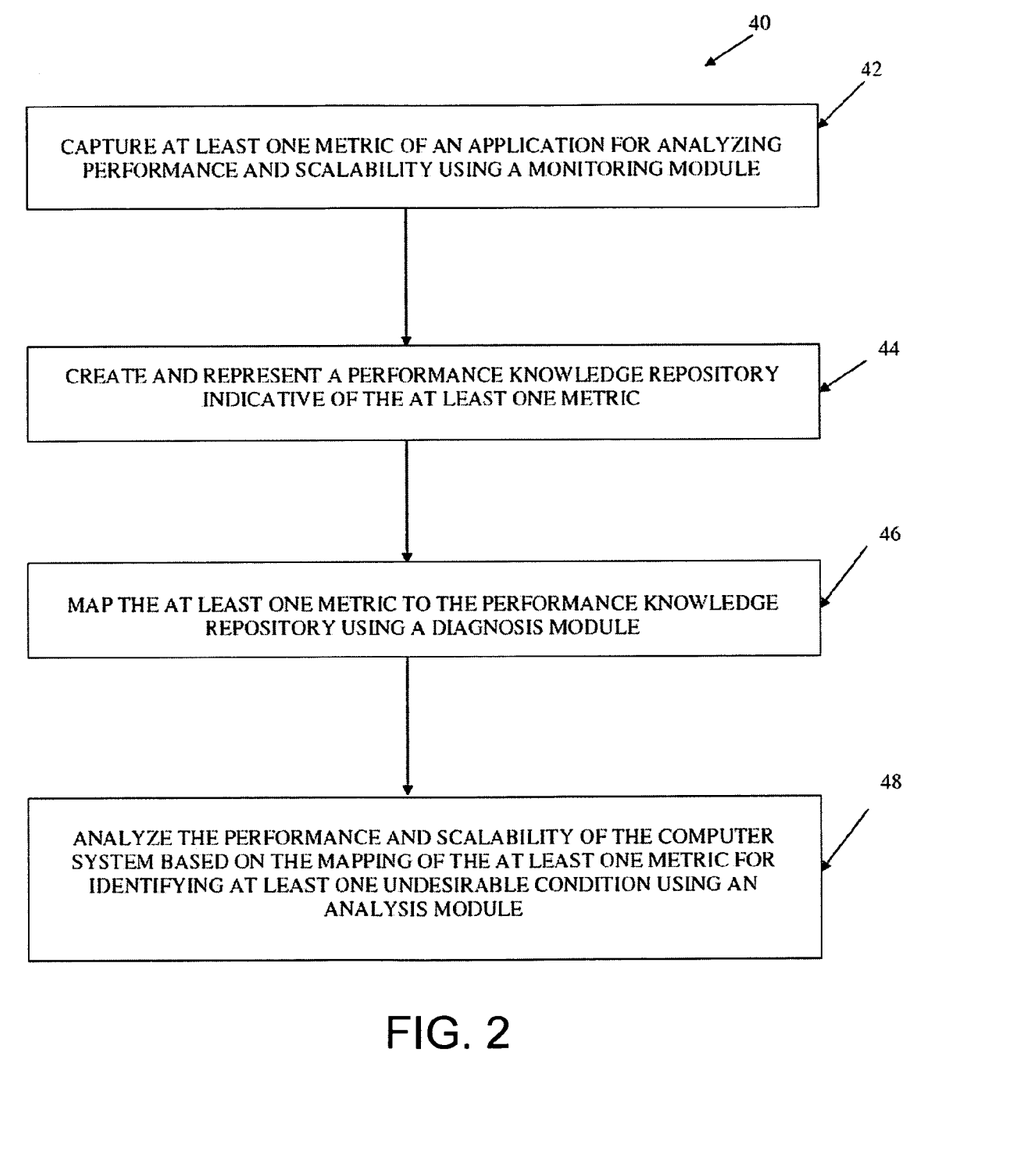
FIG. 2 is a flowchart illustrating an exemplary method for analyzing performance and scalability of at least one computer system, in accordance with an embodiment of the present technique.

FIG. 2 is a flowchart illustrating an exemplary method 40 for analyzing performance and scalability of at least one computer system. As illustrated, the method 40 starts in step 42 by capturing at least one metric of the application for analyzing performance and scalability using the monitoring module. In one implementation of the present technique, capturing the at least one metric further comprising collecting the at least one metric from performance monitoring utilities. The method continues in step 44 by creating and storing the performance knowledge repository indicative of the at least one metric. Furthermore, the method may include updating periodically the performance knowledge repository for improving performance of the diagnosis module. It should be noted in one implementation of the present technique, the performance knowledge repository may be created using a machine learning framework. In another implementation, the performance knowledge repository may be automatically created.

At step 46, the at least one metric is mapped to the performance knowledge repository using the diagnosis module. The method 40 concludes in step 48 by analyzing the performance and scalability of the computer system based on the mapping of the at least one metric for identifying at least one an undesirable condition using the analysis module. It should be noted that identifying the at least one undesirable condition further comprises identifying a cause of the undesirable condition and providing recommendation at least one solution based on the analysis of the performance and scalability of the at least one computer system. In another embodiment of the present technique, the at least one undesirable condition is detected by raising alerts. In yet another embodiment of the present technique, the method 40 may include comprising proposing at least one recommendation on any undesirable condition on the performance and scalability of the computer system. In another embodiment of the present technique, the method may include integration of the performance knowledge repository to existing load testing tools for performing scalability.

As will be appreciated by those skilled in the art, in certain implementation of the present technique, the method may include evaluating the at least one metric with performance patterns represented by Acyclic graphs. In one embodiment of the present technique a Bayesian networks may be used in the present implementation.

A Bayesian network (BN) is a graphical representation that is based on probability theory. It is a directed acyclic graph with nodes, arcs, tables and their associated probability values. These probabilities may be used to reason or make inferences within the system. Further, BNs have distinct advantages compared to other methods, such as neural networks, decision trees, and rule bases, when it comes to modeling a diagnostic system. One of the many reasons why Bayesian network is preferred over decision trees is that in BN it is possible to traverse both ways. Recent developments in this area include new and more efficient inference methods, as well as universal tools for the design of BN-based applications.

The method 40 may also include updating periodically the performance knowledge repository for improving performance of the diagnosis module. Periodic updating of the knowledge base not only ensures a rich collection of performance heuristics but also makes the diagnostic process more effective with time. In one embodiment of the present technique, the method may also include a healing system adapted for automatically rectifying the at least one undesirable condition during post deployment stage. This healing system would look at the bottleneck alerts or alerts for any undesirable conditions that may be generated. In one embodiment of the present technique, the healing system may also come up with effective methods of rectifying those undesirable conditions. By way of an exemplary example, one of such methods would be modifying the configuration parameters in an XML file in order to rectify undesirable conditions.

The method 40 further comprises forecasting the at least one undesirable condition based on past and current undesirable condition and generate at least one report on the performance and scalability using a report generation module. By way of an exemplary example, the reports may be generated in form of hyper text mark-up language (HTML) file that details the possible undesirable conditions based on the forecasting done from the past and the present trends.

Figure 3:
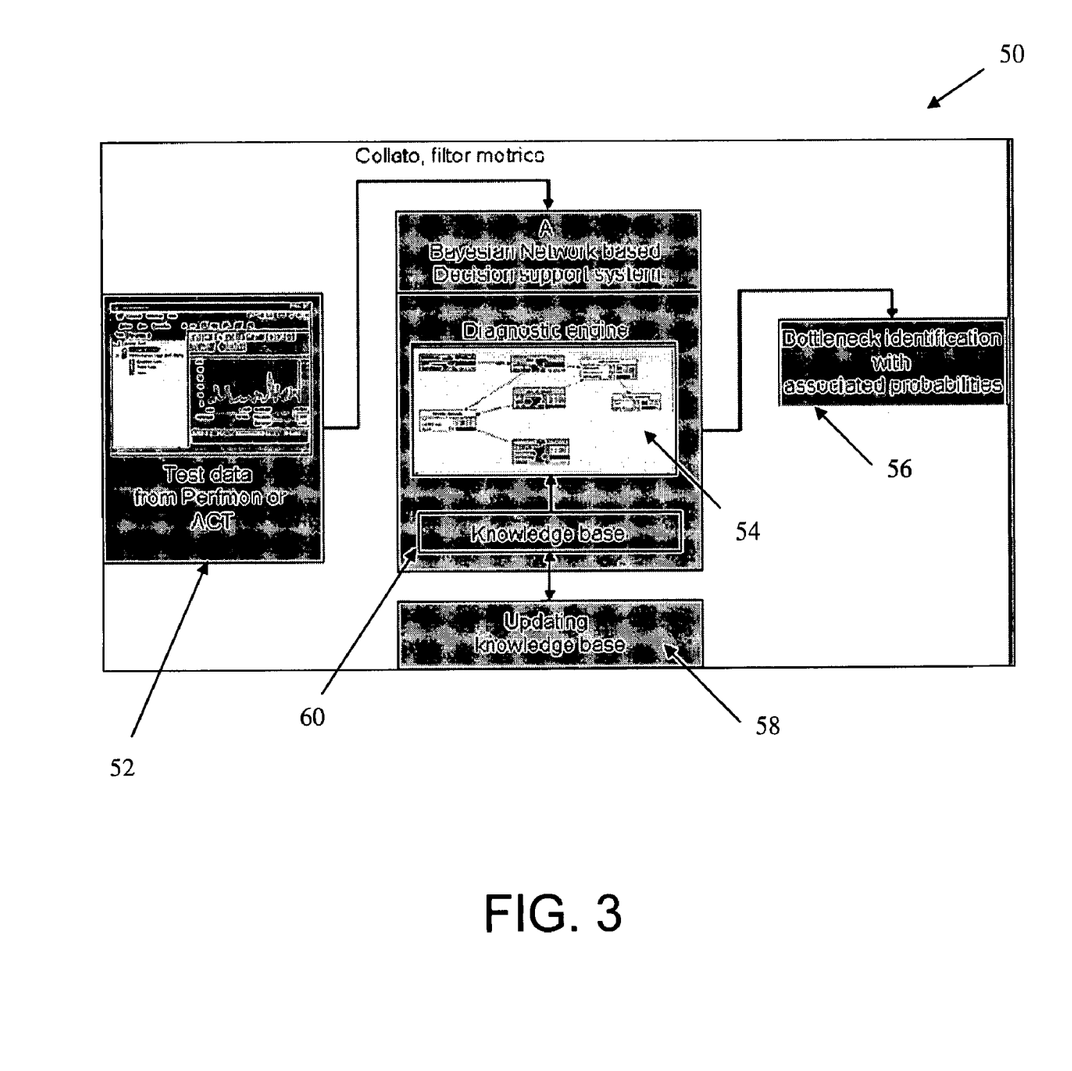
FIG. 3 depicts an exemplary design of a method for performance and scalability of analysis using the present technique, in accordance with an embodiment of the present technique.

FIG. 3 depicts an exemplary design 50 of a method for performance and scalability of analysis using the present technique. As illustrated in FIG. 3, test data 52 may be adapted for collecting/monitoring metrics that may be identified apriori from performance monitoring utilities like Microsoft's Perfmon/Logman, Microsoft's ACT. These metrics may include, but not limited to, performance counters from different performance objects at hardware resource level, application server level, webserver level and also from the application itself.

Further, the design 50 includes a method to evaluate the metrics data using a diagnosis engine 54 or also referred earlier as diagnosis module. This diagnosis engine may be capable of looking at the metrics data and analyzing, if data has any undesirable conditions.

The method continues, in representing the diagnosis engine 54. In one implementation of the present technique, these performance heuristics may be represented by using acyclic graphs. In the present technique, Bayesian networks may be used. Performance Heuristics form a collection of an expert's or analyst's experience in handling the performance analysis problems.

The monitoring module illustrated in FIG. 3 is termed as 'Test data for Perfmon or ACT' whereas the diagnosis and analysis module is termed as 'Diagnostic engine'. The monitoring module takes test configuration details, such as the type of servers, hostname, and load levels as inputs. Based on the type of the server, the metrics to be captured are determined by the module. The monitoring module then generates performance counter logs with relevant metrics on the local machine. When testing starts, the module sends instructions to the relevant host machines to retrieve the specific metrics. After the tests are run these performance counter logs are subjected to the diagnosis module that determines the health of the system by mapping the metrics captured in the logs to the performance heuristics present in the performance knowledge base 56. The counter logs are also subjected to the analysis module in order to determine whether the given computer system meets the expected performance and scalability criteria. This may be done by using the performance heuristics that are present in the performance knowledgebase.

The diagnostic engine 54 in addition to monitoring 56 the undesirable conditions in the application under consideration, it also generates alerts and recommendations well in advance so that the user has enough bandwidth to react to any unforeseen criticalities related to the application. It should be noted that the diagnosis engine works in a Bayesian network based decision support system.

Furthermore, in another embodiment of the present technique, the method includes updating 58 the performance knowledge base 60 periodically in order to build an effective diagnosis engine also forms a major part of this performance and scalability analysis. A more effective analysis is possible with a richer collection of performance heuristics.

Figure 4:
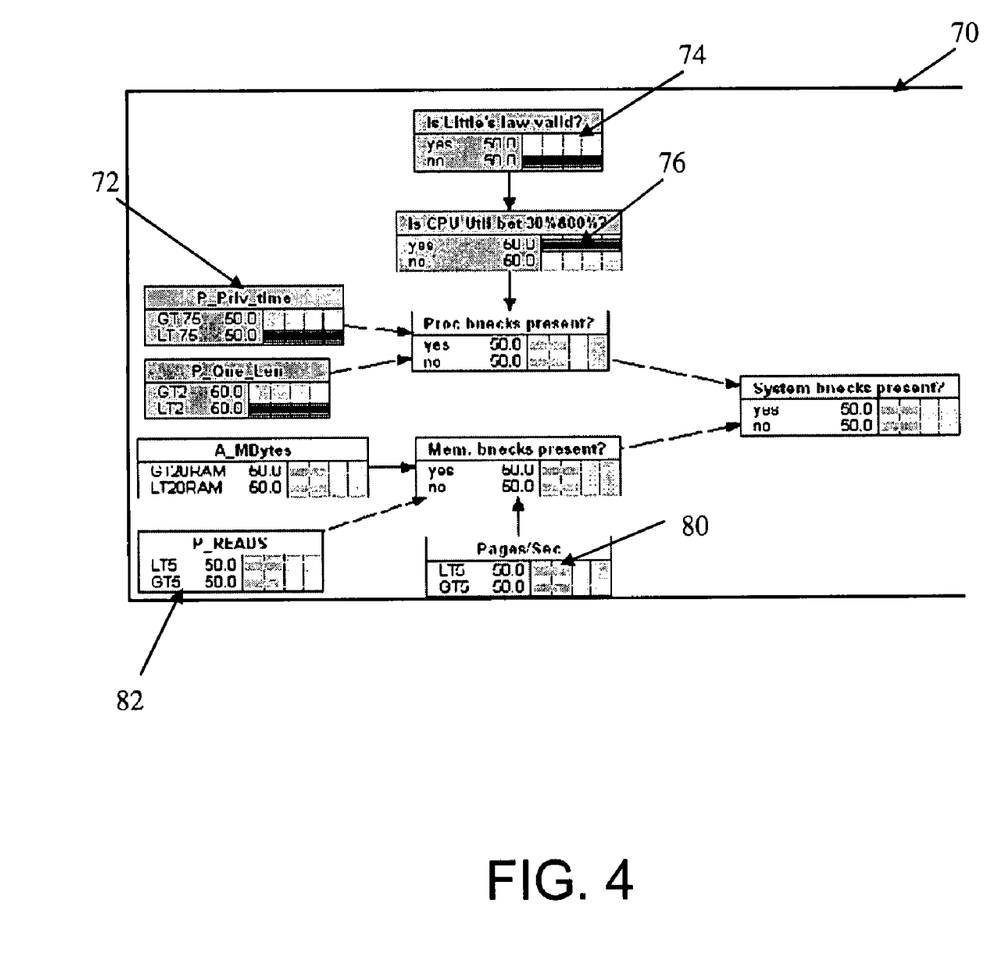
FIG. 4 depicts an exemplary representation of a performance knowledge base using Bayesian networks, in accordance with an embodiment of the present technique.

FIG. 4 depicts an exemplary representation 70 of performance knowledge base using Bayesian networks. As mentioned above, a Bayesian network (BN) is a graphical representation that is based on probability theory. It is a directed acyclic graph with nodes, arcs, tables and their associated probability values. In this representation 70 each node 72 denotes a performance heuristic or a rule and edges or arcs enabling the framework that connects these nodes. An effective representation of this performance knowledgebase will ensure that there is a systematic flow to identify the performance bottlenecks.

In one sample representation the 'Little Law validation' 74 is placed right at the beginning of the network. By way of example, if N stands for Number of users, X for Transaction throughput, R for Transaction response time and Z for Think time, then the Little's Law validates the equation: $N=X*(R+Z)$. Little's Law check is mandatory even before the system 10 look for undesirable conditions in the application as this validates the setup. If Little's Law is violated it may mean that either the process adapted or the data captured is incorrect.

Following Little's Law check, the check for CPU utilization 76 bounds is conducted. It should be noted that generally, the CPU utilization should be ideally between 30% and 80% for a typical application. More than 80% utilization would mean that the CPU is overloaded. This is followed with a few centralized nodes like 'Processor bottlenecks', 'Memory bottlenecks' 80, 'Disk bottlenecks', 'Network bottlenecks' etc. The inputs to each of these centralized nodes would be from their performance counter nodes 82. For example, the node called 'Processor bottlenecks' will have its inputs coming from the nodes like 'Processor Privileged time', Processor Queue length' etc.

One of the advantages of this representation is, by observing a few important nodes in this large network one may tell about the performance bottlenecks or any undesirable conditions in the system under consideration. By way of an exemplary example, one may need to only look at the node called 'Memory bottlenecks' to decide if there are any Memory related bottlenecks. This may save a lot of time and effort spent in looking at each and every performance heuristic related to memory. Likewise, other nodes may also be implemented using the above techniques.

Figure 5:
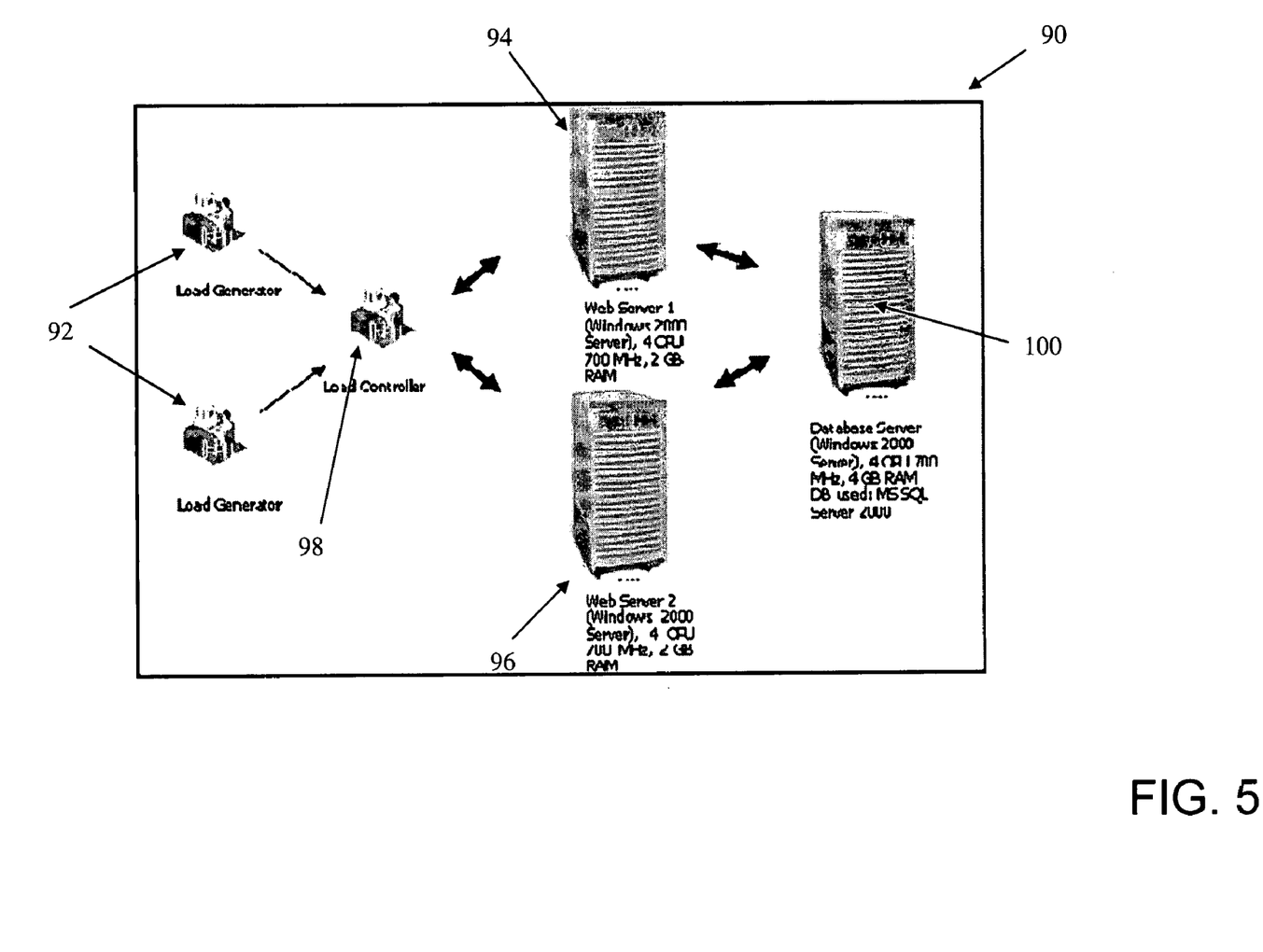
FIG. 5 represents an exemplary deployment diagram of a system based on dot net (.NET) framework, in accordance with an embodiment of the present technique.

FIG. 5 represents an exemplary deployment diagram of a system 90 based on dot net (.NET) framework. The requests may be fired from at least one load generator 92 to a cluster of two Web servers (web server 1 94 and web server 2 96) that are load balanced.

The load generator 92 is the machine that executes the test script, enabling the virtual users to imitate the actions of a human user. When a load test is executed the virtual users emulate the actions of human users working with the application. While a workstation accommodates only a single human user many virtual users may run concurrently on a single workstation. A load controller 98 may be used to administer the load test. Using the load controller 98, all the virtual users may be controlled from a single workstation. The load controller 98 is linked to one or more load generators 92. The number of virtual users generated by these load generators 92 may be governed by the load controller 98. The performance monitors are used to collect the metrics data and this data is then subjected to the diagnosis engine for detecting undesirable conditions. The performance monitor monitors various performance counters. These counters are collected using appropriate sampling intervals and may be stored in comma separated values file for analysis at a later stage. It should be noted that in one implementation of the present technique, the web servers (94 and 96) may be integrated to a database server 100.

It should be noted that though reference is made to the (.NET) framework, as will be appreciated by a person skilled in the art, many similar applications known in the art may be implemented using the present technique.

While, the following description id presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

Many modifications of the present invention will be apparent to those skilled in the arts to which the present invention applies. Further, it may be desirable to use some of the features of the present invention without the corresponding use of other features.

Accordingly, the foregoing description of the present invention should be considered as merely illustrative of the principles of the present invention and not in limitation thereof.

What we claim is:

1. A system adapted for analyzing performance and scalability of at least one computer system, comprising:
   a monitoring module configured for capturing at least one metric of an application for analyzing performance and scalability;
   a performance knowledge repository comprising a node structure of nodes that denote performance rules or heuristics that are created and represented by using the at least one metric captured by the monitoring module;
   a diagnosis module adapted for mapping the at least one metric to the performance knowledge repository; and
   an analysis module configured for conducting performance and scalability analysis based on the mapping of the at least one metric for detecting at least one undesirable condition and the relationships between the nodes in the performance knowledge repository.

2. The system according to claim 1, further comprising a simulation module adapted for simulating the performance and scalability of the at least one computer system.

3. The system according to claim 1, further comprising a first module adapted for forecasting the performance and scalability patterns for future operations based on previous completed analysis.

4. The system according to claim 1, further comprising a second module adapted for generating alerts to at least one user on the at least one undesirable condition.

5. The system according to claim 1, further comprising a feedback module adapted for providing feedback to the at least one user on the performance and scalability of the system.

6. The system according to claim 1, further comprising a report generation module adapted for generating at least one report on the performance and scalability of the system.

7. The system according to claim 1, further comprising a third module adapted for providing recommendations to the at least one user based on the at least one report.

8. The system according to claim 1, wherein the application comprises at least one of a web based application, or a client server application or combinations thereof.

9. The system according to claim 1, wherein the at least one metric comprises at least one of an overall application metric or a system resource level metric.

10. A method adapted for analyzing performance and scalability of at least one computer system, comprising the steps of:
    capturing at least one metric of an application for analyzing performance and scalability using a monitoring module;
    creating and representing a performance knowledge repository wherein at least part of the knowledge repository comprises a node structure of nodes that denote performance rules or heuristics that are indicative of the at least one metric;
    mapping the at least one metric to the performance knowledge repository using a diagnosis module; and
    analyzing the performance and scalability of the computer system based on the mapping of the at least one metric for identifying at least one undesirable condition using an analysis module which uses the relationships between the nodes in the performance knowledge repository to reach its conclusions.

11. The method according to claim 10, wherein capturing the at least one metric further comprises collecting the at least one metric from performance monitoring utilities.

12. The method according to claim 10, wherein said node structure is represented by Acyclic graphs.

13. The method according to claim 12, wherein the Acyclic graphs comprise a Bayesian network.

14. The method according to claim 10, further comprising proposing at least one recommendation on any undesirable condition on the performance and scalability of the computer system.

15. The method according to claim 10, further comprising updating periodically the performance knowledge repository for improving performance of the diagnosis module.

16. The method according to claim 10, wherein identifying the at least one undesirable condition further comprises identifying a cause of the undesirable condition and providing recommendation at least one solution based on the analysis of the performance and scalability of the at least one computer system.

17. The method according to claim 10, further comprising creating the performance knowledge repository using a machine learning framework.

18. The method according to claim 10, further comprising integration of the performance knowledge repository to existing load testing tools for performing scalability analysis.

19. The method according to claim 10, further comprising a healing system adapted for automatically rectifying the at least one undesirable condition during post-deployment stage.

20. The method according to claim 10, further comprising forecasting the at least one undesirable condition based on past and current undesirable conditions.

21. The method according to claim 10, further comprising generating at least one report on the performance and scalability using a report generation module.

22. The method of claim 10, further comprising:
   capturing at least one metric relevant to a lifecycle stage of an application;
   interpreting of threshold values of said at least one metric relevant to said lifecycle stage;
   providing a relationship between the said least one metric relevant to said lifecycle stage and the interpretation; and
   generating a set of recommendations to be performed after the performance and scalability analysis.

23. The method of claim 10, further comprising:
   creating and representing a performance knowledge repository indicative of the at least one metric;
   mapping the at least one metric to the performance knowledge repository using a diagnosis module; and
   detecting the at least one undesirable condition by analyzing the performance and scalability of the computer system; and
   automatically rectifying the at least one undesirable condition during the post-deployment stage of the application.

24. A computer storage device tangibly embodying a plurality of instructions on a computer readable medium for performing a method for analyzing performance and scalability of at least one computer system, comprising the steps of:
   program code adapted for capturing at least one metric of an application for analyzing performance and scalability using a monitoring module;
   program code adapted for creating and representing a performance knowledge repository wherein at least part of the knowledge repository comprises a node structure of nodes that denote performance rules or heuristics that are indicative of the at least one metric;
   program code adapted for mapping the at least one metric to the performance knowledge repository using a diagnosis module; and
   program code adapted for analyzing the performance and scalability of the computer system based on the mapping of the at least one metric for identifying at least one undesirable condition using an analysis module which uses the relationships between the nodes in the performance knowledge repository to reach its conclusions.

25. The computer storage device according to claim 24, further comprising program code adapted for having said node structure represented by Acyclic graphs.

26. The computer storage device according to claim 24, further comprising program code adapted for periodically updating the performance knowledge repository for improving performance of the diagnosis module.

27. The computer storage device according to claim 24, further comprising program code adapted for representation of the performance knowledge repository for analyzing the performance and scalability of the system.

28. The computer storage device according to claim 24, further comprising program code adapted for detecting the at least one undesirable condition by raising alerts.

* * * * *